United States Patent
Badenhorst (10) Patent No.: US 11,518,679 B2
(45) Date of Patent: Dec. 6, 2022

(54) COMPOSITION OF MATTER FOR THE PRODUCTION OF HIGH PURITY, HIGH DENSITY GRAPHITE

(71) Applicant: Carbonscape Limited, Blenheim (NZ)

(72) Inventor: Heinrich Badenhorst, Blenheim (NZ)

(73) Assignee: Carbonscape Limited, Blenheim (NZ)

( * ) Notice: Subject to any disclaimer, the term of this patent is extended or adjusted under 35 U.S.C. 154(b) by 0 days.

(21) Appl. No.: 17/659,985

(22) Filed: Apr. 20, 2022

(65) Prior Publication Data

US 2022/0340427 A1 Oct. 27, 2022

Related U.S. Application Data

(63) Continuation of application No. PCT/NZ2021/050146, filed on Aug. 25, 2021.

(60) Provisional application No. 63/177,705, filed on Apr. 21, 2021.

(51) Int. Cl.
  *C01B 32/205* (2017.01)
  *H01M 10/0525* (2010.01)
  *C01B 32/215* (2017.01)

(52) U.S. Cl.
  CPC .......... *C01B 32/205* (2017.08); *C01B 32/215* (2017.08); *H01M 10/0525* (2013.01); *C01P 2006/12* (2013.01); *C01P 2006/40* (2013.01)

(58) Field of Classification Search
  None
  See application file for complete search history.

(56) References Cited

U.S. PATENT DOCUMENTS

2020/0381732 A1* 12/2020 Wagner .................. C01B 32/20

FOREIGN PATENT DOCUMENTS

CN  112397764 A  *  2/2021
EP  3578512 A1  12/2019

OTHER PUBLICATIONS

Dahn, J.R., Zheng, T., Liu, Y. and Xue, J.S., 1995. Mechanisms for lithium insertion in carbonaceous materials. Science, 270(5236), pp. 590-593.
Franklin, R.E., 1951. The structure of graphitic carbons. Acta crystallographica, 4(3), pp. 253-261.
Mochida, I., Ohtsubo, R., Takeshita, K. and Marsh, H., 1980. Catalytic graphitization of non-graphitizable carbon by chromium and manganese oxides. Carbon, 18(2), pp. 117-123.
Nishida, T., 2009. Trends in carbon material as an anode in lithium-ion battery. In Lithium-ion batteries (pp. 329-341). Springer, New York, NY.
Ōya, A., Yamashita, R. and Ōtani, S., 1979. Catalytic graphitization of carbons by borons. Fuel, 58(7), pp. 495-500.

(Continued)

*Primary Examiner* — Daniel S Gatewood
(74) *Attorney, Agent, or Firm* — Barnes & Thornburg LLP; Ryan L. Marshall (57) ABSTRACT

The present invention relates to a composition for the production of a graphite powder, suitable for making high performance lithium-ion battery anodes and other applications. The composition of matter comprises a biochar, a metal and graphite. The biochar is typically derived from the pyrolysis of woody biomass. The metal is typically a transition metal derived from the decomposition and reduction of an organic or inorganic metallic compound. The graphite is highly crystalline and has a wide range of morphologies or structures.

12 Claims, 9 Drawing Sheets

(56) References Cited

OTHER PUBLICATIONS

Tatsumi, K., Iwashita, N., Sakaebe, H., Shioyama, H., Higuchi, S., Mabuchi, A. and Fujimoto, H., 1995. The influence of the graphitic structure on the electrochemical characteristics for the anode of secondary lithium batteries. Journal of the Electrochemical Society, 142(3), p. 716.
European Search Report issued by the European Patent Office for European Patent Application No. 22168293.3, dated Sep. 14, 2022; 9 pages.
Huggins Tyler M et al: "Graphitic biochar as a cathode electrocatalyst support for microbial fuel cells", Bioresource Technology, Elsevier, Amsterdam, NL, vol. 195, Jun. 9, 2015 (Jun. 9, 2015), pp. 147-153, XP029258403, ISSN: 09608524, DOI: 10.1016/J. BIORTECH.2015. 06.012.
Muslum Demir et al: "Graphitic Biocarbon from Metal-Catalyzed Hydrothermal Carbonization of Lignin", Industrial & Engineering Chemistry Research, vol. 54, No. 43, Oct. 16, 2015 (Oct. 16, 2015), pp. 10731-10739, XP055488148, ISSN: 0888-5885, DOI: 10.1021/acs.iecr.5b02614.

\* cited by examiner

COMPOSITION OF MATTER FOR THE PRODUCTION OF HIGH PURITY, HIGH DENSITY GRAPHITE

CROSS-REFERENCE TO RELATED APPLICATIONS

This application is a continuation of International Application Serial No. PCT/NZ2021/050146, filed on Aug. 25, 2021, which claims the benefit of U.S. Provisional Application Ser. No. 63/177,705, filed on Apr. 21, 2021, the entire disclosures of which are incorporated herein by reference.

FIELD OF THE INVENTION

The present invention relates to a composition of matter suitable for the production of a graphite powder, suitable for making high performance lithium-ion battery anodes and other applications. The composition of matter comprises a biochar, a metal and graphite.

BACKGROUND OF THE INVENTION

Lithium-ion batteries have become ubiquitous in society, being used in anything from portable electronic equipment to power tools to electrical vehicles. The rise in utilisation of lithium-ion batteries has driven the development to explore new and improved materials of construction to increase performance. In addition, certain lithium-ion battery components are limited in supply and will only increase in scarcity as demand grows with the global transition to an electrical infrastructure rather than a fossil fuel based one. For this reason, there is a concerted effort to find alternative raw material sources, most suitably from renewable resources to ensure sustainability. One of the components in the lithium-ion battery that is in short supply is graphite.

Graphite is either synthesised from petroleum-based precursors or obtained from natural deposits. Some carbon materials, such as coke and mesophase pitch can be transformed to graphite simply by heating and such materials are termed graphitizable. Other carbon materials, for example char and some carbonised polymers, require the addition of other components in order to facilitate the transformation into graphite [1,2]. However, for application in lithium-ion batteries very specific requirements must be met. Only graphite materials with a very narrow range of properties are capable of delivering the performance essential for modern applications. Innumerable possibilities exist for arriving at a mixture of graphite, catalyst and residual char. However, only a small subset of such mixtures result in a composition of matter suitable for further processing into graphite and eventual use in lithium-ion batteries.

The present invention specifically discloses a composition of matter appropriate for producing a graphite powder suitable for use in commercial, high performance lithium-ion batteries. The disclosure lays down the ranges required, not only of the elemental composition but also the relative amounts of the distinguishable carbon allotropes. Furthermore, the properties associated with the structure and crystalline state of each of the components are definable.

SUMMARY OF THE INVENTION

The present disclosure provides a composition of matter comprising a mixture of biochar, a metal and graphite. This mixture has a set of unique properties which allows it to be processed into a high performance lithium-ion battery anode powder. The mixture may also be processed into graphite powders for use in other applications. Methods for producing this composition of matter are also disclosed.

In one aspect there is provided a composition of matter comprising a mixture of biochar, a metal and graphite. In one embodiment the mixture has (a) a graphite content of between about 25 to 65 percent by weight, (b) a metal content of between about 15 to 75 percent by weight and (c) a biochar content of between 1 and 35 percent by weight.

In one embodiment the graphite has a d-spacing of between about 0.3354 and about 0.3401 nm.

In one embodiment the electrochemical capacity of the graphite is at least 200 mAh/g, more preferably the electrochemical capacity of the graphite is greater than 300 mAh/g.

In one embodiment the specific surface area of the graphite is between about 0.2 to about 50 $m^2/g$. More preferably the specific surface area of the graphite is less than about 20 $m^2/g$.

In one embodiment the graphite exhibits a "Coulombic" or first cycle efficiency of greater than 60%, more preferably greater than 80%.

In one embodiment the graphite content in the mixture is in particulate form.

In one embodiment the metal content in the mixture is in particulate form.

In one embodiment the biochar content in the mixture is in particulate form.

In one embodiment the graphite, metal and biochar content are all in particulate form.

In one embodiment the mixture is a binary mixture having an elemental composition of between about 25 to 75 percent carbon, made up of biochar and graphite and between about 75 to 25 percent of a selected metal.

In one embodiment the biochar content is derived from woody biomass heated to temperatures of between about 200 and 1000 degrees Celsius.

In one embodiment the metal is a transition metal. In one embodiment the transition metal is selected from chromium, zirconium, molybdenum, ruthenium, rhodium, palladium, silver, cadmium, zinc, copper, nickel, cobalt, iron, manganese, chromium, vanadium or any combination thereof.

In one embodiment the particulate sizes of the biochar component are less than about 1 millimetre.

In one embodiment the particulate sizes of the metal component are less than about 1 millimetre.

In one embodiment the particulate sizes of the graphite component are less than about 1 millimetre.

In one embodiment the particulate sizes of all the components are less than 1 millimetre.

In one embodiment the total graphitic carbon content in the mixture is greater than about 55% wt.

In one aspect there is a method of producing a mixture as defined above; the method including the steps of:
  i) thermally treating biomass in particulate form at a temperature of between 200 and 1000 degrees Celsius to form a particulate biochar;
  ii) combining the resulting biochar with a particulate metal compound in a wet or a dry form to create a precursor mixture;
  iii) heating the precursor mixture to between about 400 to about 3000 degrees Celsius under inert conditions to form a graphite containing mixture;
  iv) sieving the final mixture to below about 1 mm particulate size to produce a mixture having (a) a graphite content of between about 25 to 65 percent by weight, (b) a metal content of between about 15 to 75 percent by weight and (c) a biochar content of between 1 and 35 percent by weight.

In one embodiment the biomass is thermally treated in water in a hydrothermal step.

In one embodiment the biomass is thermally treated under inert conditions in a dry pyrolysis step.

In one embodiment the biomass is forestry residue.

In one embodiment the forestry residue is sawdust.

In one embodiment the biomass is woodchip or any other wood-based material.

In one embodiment the biomass particles are less than about 10 mm. In one embodiment the biomass particles are less than about 1 mm.

In one embodiment the particulate sizes of the graphite, metal and biochar are all less than about 1 millimetre after sieving.

In one embodiment the method includes the further steps such as but not limited to purification by acid leaching the mixture (or other means), washing and filtering the resulting graphite sample to high purity graphite. Additional steps may include densification or spheroidization and carbon coating to further enhance performance.

The foregoing and other aspects or advantages of the present invention will be apparent to those skilled in the art, using the detailed description, images, analytical results and performance test outcomes provided in this specification.

DETAILED DESCRIPTION OF THE INVENTION

The following description sets forth numerous exemplary configurations, parameters, and the like. It should be recognised, however, that such description is not intended as a limitation on the scope of the present invention but is instead provided as a description of exemplary embodiments.

All references, including patents and patent applications, cited in this specification are hereby incorporated by reference. No admission is made that any reference constitutes prior art. Nor does discussion of any reference constitute an admission that such reference forms part of the common general knowledge in the art, in New Zealand or in any other country.

Definitions

In each instance herein, in descriptions, embodiments, examples, and claims, the terms "comprising", "including", etc., are to be read expansively, without limitation. Thus, unless the context clearly requires otherwise, throughout the description and the claims, the words "comprise", "comprising", and the like are to be construed in an inclusive sense as to opposed to an exclusive sense, that is to say in the sense of "including but not limited to".

As used herein, the articles "a" and "an" are used to refer to one or to more than one (i.e., to at least one) of the grammatical object of the article. By way of example, "an element" can be taken to mean one element or more than one element.

The term "about" or "approximately" is used to indicate a broader range centred on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Unless defined otherwise, the scientific and technological terms and nomenclature used herein have the same meaning as commonly understood by a person of ordinary skill to which this disclosure pertains.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the first significant digit. Thus, a value 1.105 implies a value from 1.0 to 1.2, whereas 110.5 given by $1.105 \times 10^2$, implies a value from 100 to 120.

As used herein the terms "biochar" or "carbonaceous char" or "char" are used interchangeably to mean a material resulting from the thermal decomposition of a carbonaceous material in an inert atmosphere.

As used herein the term "amorphous" means a material with no long- or short-range structural ordering, as opposed to a crystal which has an atomic arrangement in the form of a regular lattice, comprised of repetitions of a defined unit cell.

As used herein the term "allotropes" means materials with the same elemental composition, such as pure carbon for example, but with different forms or atomic configurations, for example diamond versus graphite or amorphous biochar/char versus graphite.

As used herein the term "thermally treated" means any thermal treatment process that is applied to biomass at a temperature sufficient to create a biochar, including hydrothermal and dry pyrolysis.

As used herein the term "high performance" in relation to lithium-ion battery anode powder, means a graphite powder with a d-spacing of between 0.3354 and 0.3401 nm which results in an electrochemical capacity of at least 200 mAh/g and a specific surface area of between about 0.2 to 50 $m^2/g$ which results in a "Coulombic" or first cycle efficiency of greater than 60%.

Composite of Biochar, Metal and Graphite

The novel composition of matter described in this specification is comprised of biochar, a metal and graphite. The biochar is typically derived from the pyrolysis of woody biomass. The metal is typically a transition metal derived from the decomposition and reduction of an organic or inorganic metallic compound. The graphite is highly crystalline and has a wide range of morphologies or structures. To produce the composite of interest, the required precursors (biochar and metallic compound) are mixed and subjected to a heat treatment procedure at a temperature of between 400 and 3000 degrees Celsius for soak time periods of between 60 seconds and 20 hours.

In general, a biochar is produced by pyrolyzing a biomass starting material, such as wood chips, saw dust, forestry residue or waste, or any plant derived feedstock, under an inert atmosphere, for example nitrogen, at temperatures of between 200 and 1000 degrees Celsius, for time periods of between a few seconds ("fast" pyrolysis) up to several hours. Alternatively, the biomass can be converted into char using a hydrothermal approach. Here the char and water can be placed in an autoclave at around 360 degrees Celsius and a pressure of approximately 200 bar for the same time periods as pyrolysis, followed by drying. In all cases the resulting char is comprised mainly of the element carbon, with a so-called fixed carbon content above at least 40% but more usually above 60%. The remainder is comprised of a set of heteroatoms, mainly hydrogen, oxygen, nitrogen and sulphur. In addition, the char may contain volatile matter, defined as hydrocarbons, aliphatic or aromatic, which are of high enough molecular weight to not have been vaporised during the heat treatment. The exact composition will depend on the pyrolysis conditions and the selected biomass starting material. This material is conventionally referred to as a "green" char.

Any of the described biochar materials could be selected for the creation of the aforementioned precursor mixture. It is even possible to use raw biomass directly, which is then transformed into char during the heat treatment procedure. Following subjection of the precursor mixture (biochar and metallic compound) to the stated heat treatment procedure, the char is altered in two ways. Firstly, practically all of the residual heteroatoms and volatile matter have been removed, resulting in a material that is virtually exclusively carbon and has a fixed carbon content in excess of ~99%. This material is conventionally referred to as a "calcined" or "fully carbonized" char. Secondly, the mass of carbon has been reduced. The carbon acts as a reductant for the organic or inorganic metallic compound that makes up a part of the precursor mixture.

The metallic precursor may be any one of the innumerable organic or inorganic metallic compounds which are possible. The metal component of the compound is preferably a transition metal, such as but not limited to chromium, zirconium, molybdenum, ruthenium, rhodium, palladium, silver, cadmium, zinc, copper, nickel, cobalt, iron, manganese, chromium, vanadium or any combination thereof. However, the metal component may also be comprised of non-transition metals such as: sodium, magnesium, potassium, calcium, tin, lead and others. Upon heat treatment, most organic and some inorganic compounds will undergo decomposition(s) to form a metal oxide. However, this is not a requirement, instead the only critical prerequisite is that the original compound or formed intermediate compound(s) can be reduced to its metallic state during the heat treatment process. The reduction is typically achieved under an inert atmosphere, in the presence of the aforementioned carbon (char) component. This process results in a reduction in solid mass as well as particle size, due to the loss of non-metallic elements as gas and an increase in density of the metal relative to the compound (in most cases).

When an elemental metal is exposed to a carbon source such as char at a temperature of between 400 and 3000 degrees Celsius under inert conditions, the process of catalytic conversion will occur. Hereby the "fully carbonized", amorphous char will be converted into highly crystalline graphite over time. In so doing converting one allotrope of pure carbon into another. The extent and speed of formation of the graphite is highly dependent on the selected metal but is relatively insensitive to the original choice of biomass, mainly because it has been fully carbonized. The exact mechanism of the catalytic transformation is still unknown but two plausible theories have been put forward, namely dissolution-precipitation and carbide formation-decomposition. In the former a carbon source is dissolved in the metal and graphite is spontaneously precipitated due to differences in their free energy or level of structural ordering. In the latter an unstable metal carbide is formed, which spontaneously decomposes to yield graphite. The exact formation mechanism is not relevant to the current composition of matter.

Depending on the selected heat treatment temperature and soak time a varying amount of char will be converted into graphite. Overall, the current novel composition of matter can be defined in terms of its elemental composition. Given the fact that the biochar component is fully carbonized to contain in excess of ~99% carbon and graphite is also an allotrope of pure carbon, the composite is a binary mixture with an elemental composition of between 25 to 75 percent carbon and the difference being made up of a selected pure metal (when an alloy is not used).

In the second instance the carbon may be subdivided into its two allotropes namely the residual char and formed graphite. The relative amount of graphite (as a percentage of the carbon present) may be between about 55 and about 99.9% wt, with residual char making up the remaining about 45% down to about 0.1% wt. For graphitic materials this percentage is also known as the "total graphitic carbon" or "TGC".

While the ideal, model structure of the graphite crystal is well known, real graphitic materials rarely achieve such crystalline perfection. A key indicator of crystalline imperfection is the so-called "d-spacing" or interlayer distance of the graphene layers comprising the graphite structure. Rosalind Franklin [3] defined the interlayer spacing of non-graphitic (i.e. amorphous) carbons as 0.3440 nm and graphite having an interlayer spacing of 0.3354 nm. Practical graphitic materials fall somewhere in between. Depending on the chosen conditions and selected metallic precursor the achieved d-spacing will vary. For the novel composition of matter under consideration, the required d-spacing may be specified as 0.3354 nm to 0.3401 nm.

In addition to the elemental composition and form or allotrope of each component, the novel composition of matter can be further defined in terms of the structure of each element. During the heat treatment procedure, the metal particles tend to agglomerate and grow in size. For the current composition of matter, it is necessary that these remain below a certain critical value. Smaller particles are better suited to a subsequent purification step due to a higher specific surface area. Thus, in general, the particle sizes of all the components in the mixture are required to be less than 1 millimetre.

However, under certain conditions, small amounts of very large metal particles can sometimes be formed, in some extreme cases up to several centimetres. This may be due to factors such as ineffective atmospheric control, choice of heating rate, system geometry, etc. These large particles only constitute a very small fraction of the mixture (<10% wt of the metal component). To remove these the entire composite may be screened or sieved to a particle size of 1 millimetre or smaller after heat treatment. If a composite includes these abnormal formations, it may still be considered to fall within the current composition of matter since they only constitute a minor proportion of the overall distribution.

The following description of a method to produce the aforementioned mixture is presented for purposes of illustration and description. It is not exhaustive and does not limit the method to the precise form disclosed. Modifications and variations are possible in light of this disclosure or may be acquired from the practicing of these methods.

The selected biochar and chosen metallic compound may be milled, if required, to ensure an even distribution. The two precursors (biochar and metal component) are then mixed in a ratio of between about 0.1 up to about 10 wt/wt. This can be done under wet or dry conditions. The mixture is heated to a temperature of between 400 and 3000 degrees Celsius in a furnace, oven, kiln, reactor vessel or similar. The heating may be achieved by resistively heated electrical elements, microwaves or the inductive coupling of high frequency electromagnetic fields. The selected heating method however must ensure homogenous heating of the entire material mass to ensure sufficient conversion and a consistent product quality throughout. Thus, surface heating techniques such as lasers or electromagnetic waves with limited sample penetration are excluded. Such techniques will not achieve the high total graphitic carbon for the carbon component (TGC >55% wt), stipulated herein as a requirement for this composition of matter. The mixture is soaked for periods of between 1 minute and 20 hours under inert atmosphere. Following this time, the mixture is cooled, removed from the furnace and sieved to a particle size below 1 millimetre to produce the said mixture with the desired properties.

The aforementioned properties of the mixture are desirable for achieving the final set of physical properties and performance characteristics to allow the resulting graphite to be used as a high-performance anode in lithium-ion batteries. The composite can be further processed to enable the measurement of some of these properties. One such step is the removal of the metal component. The relative amount and size of the metal allows for its rapid removal using acid leaching. The small particles (<1 mm) enable efficient exposure to the acid, while the chosen mass loading of between 25 to 75% wt ensures that leaching times do not become excessive. Very high purities exceeding 99.5 wt carbon can be achieved within hours. If the metal content is reduced, fast leaching is also possible but conversion into graphite will be inadequate, thereby compromising other battery anode properties.

For example, a priority specification for high performance lithium-ion battery anode material is the achievable electrochemical capacity. It has been conclusively demonstrated in academic literature [4,5] that a decrease in d-spacing results in a decrease in electrochemical capacity. Heat treated chars exhibit lower capacities than graphite [6], thus the higher TGC, the higher the achieved capacity. The high purity, highly crystalline graphite derived from the mixture (TGC >55% wt) can achieve graphite capacities in excess of 200 mAh/g and as high as 372 mAh/g, thereby satisfying the requirements for lithium-ion batteries.

A second critical specification for high performance lithium-ion battery anode materials is so-called "first cycle efficiency" or "Coulombic efficiency". It has been demonstrated that the "Coulombic efficiency" is directly correlated to the graphite powder specific surface area [5]. The specific surface area depends on a wide range of factors, including the choice of biomass source. The structure and intrinsic porosity present in the biomass structure will, to a large extent, persist all the way through the process to the graphite present in the mixture. A graphite surface area range of 0.2 to 50 $m^2/g$ or less is desirable for achieving an acceptable "Coulombic efficiency". The high purity, high density graphite derived from this novel mixture composition of matter composite has achieved "Coulombic efficiencies" of greater than 60% and as high as 99%, thereby satisfying the requirements for lithium-ion batteries.

EXAMPLES

The examples described herein are provided for the purpose of illustrating specific embodiments of the invention and are not intended to limit the invention in any way. Although the examples described herein have been used to describe a method, it is understood that such detail is solely for this purpose and variations may be made therein by those skilled in the art without departing from the spirit and scope of the overall process.

Figure 1:
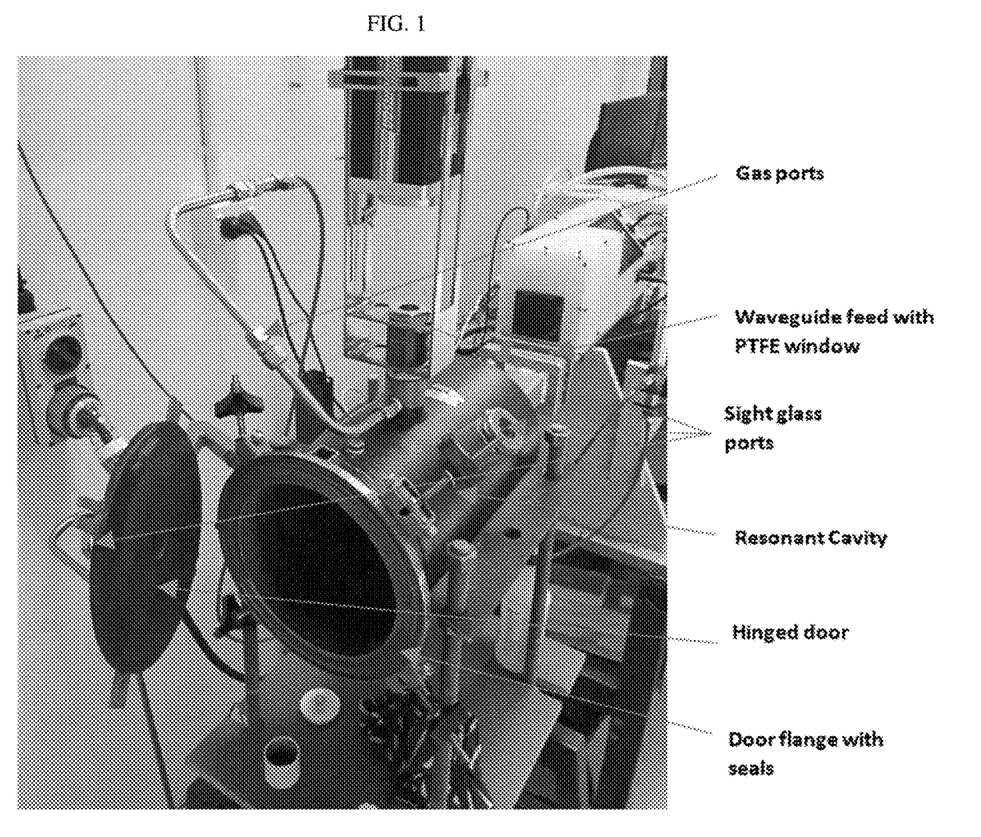
FIG. 1 shows an image of the microwave applicator used to generate the graphite samples described in this specification.
Figure 2A:
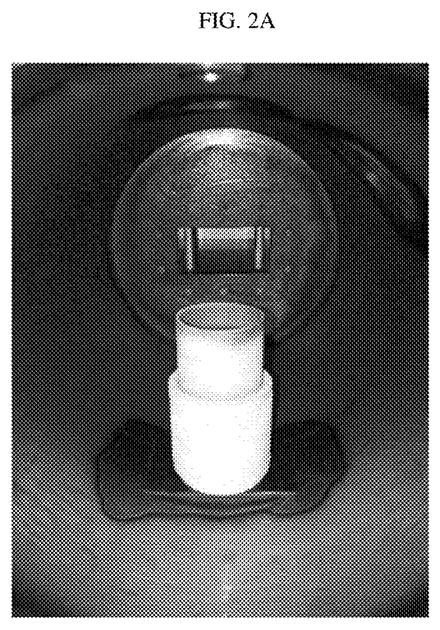
FIG. 2A shows an image of the sample crucible placement in the microwave applicator.
Figure 2B:
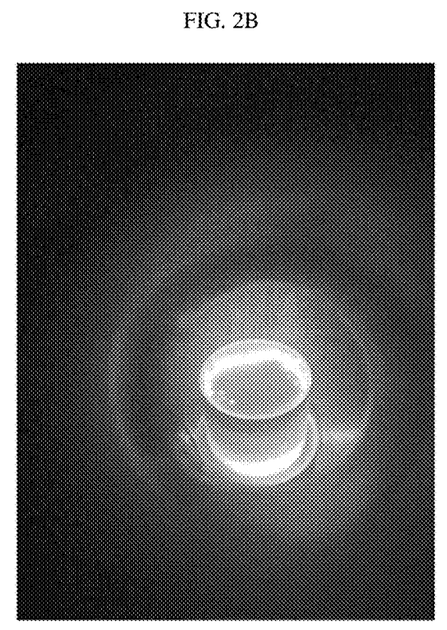
FIG. 2b shows an image of the sample crucible at high temperature.

The microwave laboratory setup which was used to produce these samples may be described as follows. A custom designed microwave applicator is used to heat samples to temperatures of up to 2000° C., with a maximum power input of 3 kW. The applicator arrangement is shown in FIG. 1. A microwave generator delivers power to the applicator via a WR340 waveguide auto-tuner, a PTFE window and a passive coupling element. The microwave generator is a 2.45 GHz YJ1600-based source (Sairem). A sample is placed within a crucible and positioned within the applicator, usually on a "pillar" or stand, at a predetermined height to obtain a specific radiation distributions (see FIG. 2A). The unit is sealed and purged using nitrogen gas (99.9% pure) at a high flowrate for approximately 1 hour to establish an inert atmosphere and then a lower purge flowrate is used to maintain it. After this the power is gradually applied at a rate of 30 W/min to allow the sample to heat up slowly and rapidly achieve steady state at the desired final power. The steady power setting is chosen to achieve a desired temperature. The final power level is then held for a specific time, depending on the desired outcome. At this point the sample is glowing red and the crucible surface temperature can be measured using a handheld pyrometer through the sight glass, as shown in FIG. 2B. Pyrometer readings demonstrated a high level of fluctuation and uncertainty, thus a temperature band is reported in the applicable Examples below. Power is then maintained steady for a given time frame, after which the generator is turned off and the resulting mixture sample allowed to cool for removal.

Example 1

Figure 3:
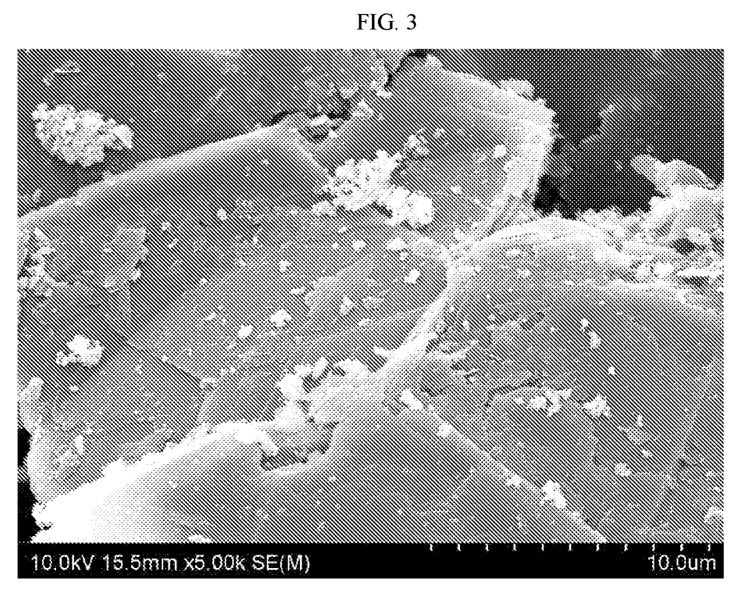
FIG. 3 shows a scanning electron image of the graphite sample generated during Example 1.
Figure 4:
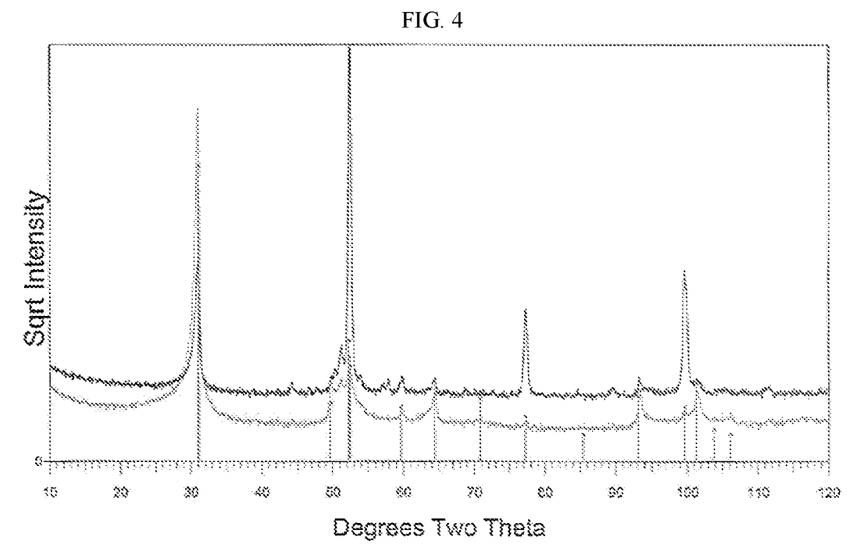
FIG. 4 shows an XRD diffractogram of the graphite sample generated during Example 1.
Figure 5:
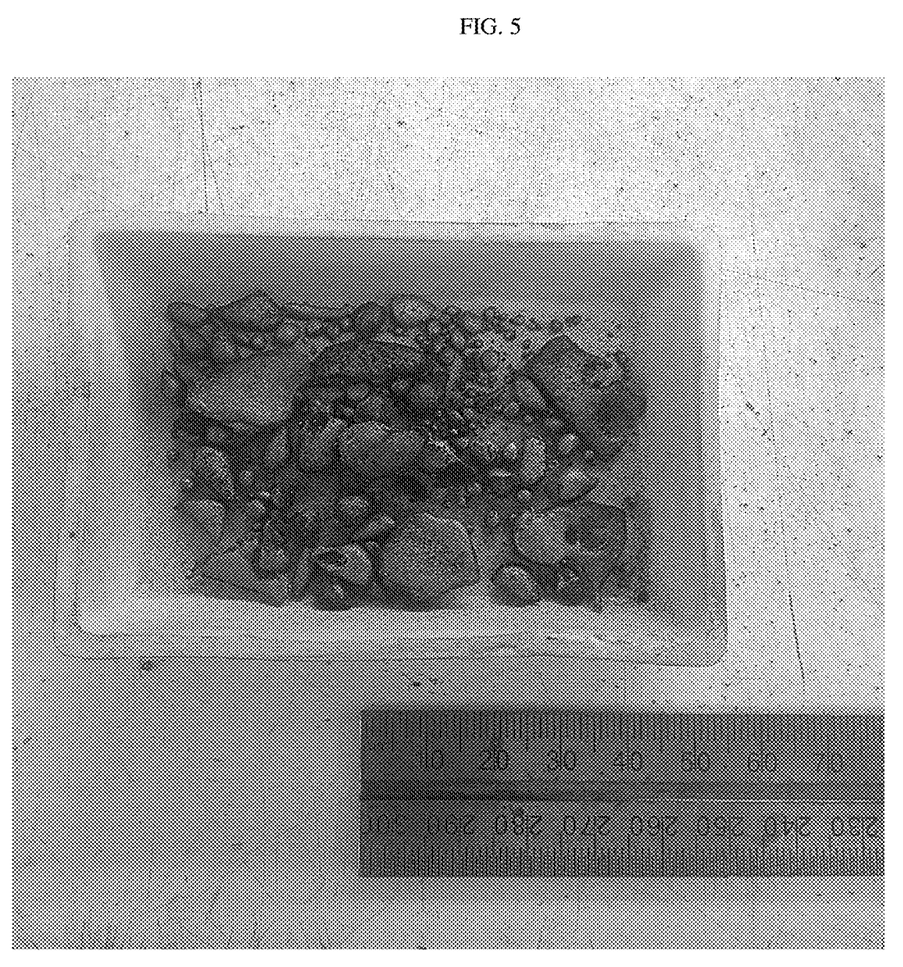
FIG. 5 shows an image of the large graphite "spheres" generated during Example 1, which were removed by sieving.

Sawdust (50 g) from pine trees (pinus radiata) was hydrothermally treated with deionised water at a temperature of 360 degrees Celsius for 20 min in an autoclave. The sample was allowed to cool and then filtered using a Buchner funnel; the resulting char was dried in a conventional oven. The dry char (17.5 g) with carbon content around 80%, was combined with 9.4 g of Manganese Acetate (tetrahydrate). The resulting mixture was placed in a crucible and transferred to the microwave applicator. Inert conditions were established using nitrogen gas as described above and power was gradually increased at a rate of approximately 30 W/min up to 1.9 kW. Temperature was measured to be between 1700-1900 degrees Celsius. The power was maintained steady for around 5 to 10 minutes after which the power was cut to the microwave applicator to produce a resulting mixture. Once cooled the sample was sieved to below 1 mm to remove some large metal particles in the mixture, at this point the mixture composition can be calculated as shown in Table 1. It was then leached with 500 ml of concentrated hydrochloric acid overnight, followed by washing with deionised water and filtering with a Buchner funnel to produce graphite. The resulting graphite was analysed using XRD (Bruker D8 Advance diffractometer using a mirror-derived 1 mm high parallel beam of cobalt K alpha radiation, weighted mean wavelength 1.709026 Angstroms) and SEM (using an ultra-high-resolution field-emission microscope: Zeiss Ultra Plus 55 FEGSEM, equipped with an in-lens detection system operating at an acceleration voltage of 1 to 10 kV. A working distance of between 1 and 5 mm was used and the powders were lightly deposited on carbon tape without any additional sample preparation). The XRD spectra is shown in FIG. 4 and indicates a d-spacing of 0.3355 nm, in addition since no other peaks except those for graphite it can be concluded that the sample has a graphite (carbon) purity in excess of 90% wt. Furthermore, since the XRD spectra lacks the broad, low intensity peak of amorphous carbon at low angles, it can be concluded that less than 20% of the carbon is not graphitic. A sample of the resulting graphite was characterised and found to have a specific surface area of 26.8 m$^2$/g. The structure of the formed graphite is shown in FIG. 3, indicating a large, flake-like, anisotropic material with highly ordered graphite crystals. This experiment produced some large metal particles in the mixture, examples of which are shown in FIG. 5.

Based on the XRD result it can be assumed that 80% of the carbon is graphitic, thus the composition of the mixture can be stated as:

(a) a graphite content of about 66 percent by weight, (b) a metal content of about 18 percent by weight, and (c) a biochar content of about 16 percent by weight.

Example 2

Figure 6:
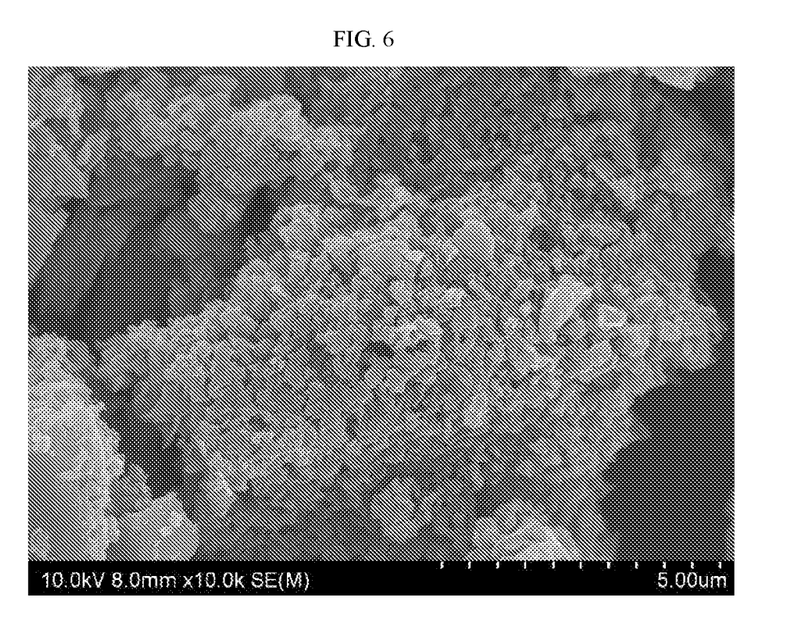
FIG. 6 shows a scanning electron image of the graphite sample generated during Example 2.
Figure 7:
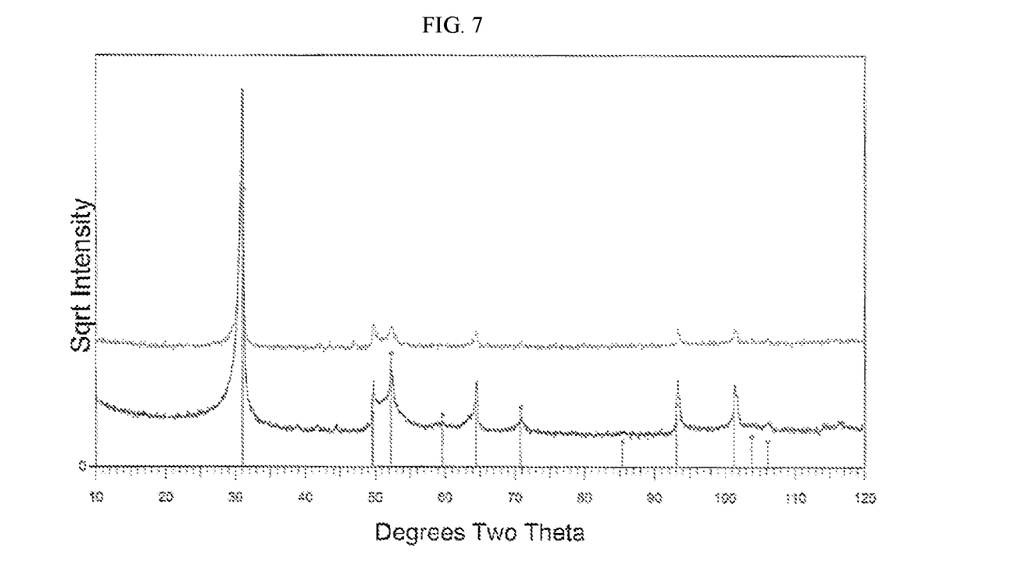
FIG. 7 shows an XRD diffractogram of the graphite sample generated during Example 2.

Sawdust (50 g) from pine trees (pinus radiata) was hydrothermally treated with deionised water at a temperature of 360 degrees Celsius for 20 min in an autoclave. The sample was allowed to cool and then filtered using a Buchner funnel; the resulting char was dried in a conventional oven. The dry char (10.1 g) with carbon content around 80%, was combined with 8.2 g of Manganese Acetate (tetrahydrate). The resulting mixture was placed in a crucible and transferred to the microwave applicator. Inert conditions were established and power was gradually increased at a rate of approximately 30 W/min up to 1.3 kW. Temperature was measured to be between 1400-1600 degrees Celsius. The power was maintained steady for around 5 to 10 minutes after which the power was cut. Once cooled the sample was sieved to below 1 mm, at this point the mixture composition can be calculated as shown in Table 2. It was then leached with 500 ml of hydrochloric acid overnight, followed by washing with deionised water and filtering with a Buchner funnel. The resulting graphite was analysed using XRD (Bruker D8 Advance diffractometer using a mirror-derived 1 mm high parallel beam of cobalt K alpha radiation, weighted mean wavelength 1.709026 Angstroms) and SEM (using an ultra-high-resolution field-emission microscope: Zeiss Ultra Plus 55 FEGSEM, equipped with an in-lens detection system operating at an acceleration voltage of 1 to 10 kV. A working distance of between 1 and 5 mm was used and the powders were lightly deposited on carbon tape without any additional sample preparation). The XRD spectra is shown in FIG. 7 and indicates a d-spacing of 0.3392 nm, in addition since no other peaks except those for graphite it can be concluded that the sample has a graphite (carbon) purity in excess of 90% wt. Furthermore, since the XRD spectra lacks the broad, low intensity peak of amorphous carbon at low angles, it can be concluded that less than 20% of the carbon is not graphitic. A sample of the graphite was characterised and found to have a surface area of 74.0 m$^2$/g. The structure of the formed graphite is shown in FIG. 6, indicating a material with smaller, random crystallites and a more isotropic structure.

TABLE 1

Example 1 - Mixture Composition

| Component | Mass (g) | Carbon Yield (%) (est.) post reduction | Carbon (g) | Metal content of Mn Acetate (%) | Metal (g) | Carbon (%) | Metal (%) |
|---|---|---|---|---|---|---|---|
| Dry char | 17.5 | 55% | 9.625 | | | 82% | |
| Mn Acetate | 9.4 | | | 22% | 2.1 | | 18% |

TABLE 2

Example 2 - Mixture Composition

| Component | Mass (g) | Carbon Yield (%) est. post reduction | Carbon (g) | Metal content of Mn Acetate (%) | Metal (g) | Carbon (%) | Metal (%) |
|---|---|---|---|---|---|---|---|
| Dry char | 10.1 | 55% | 5.555 | | | 75% | |
| Mn Acetate | 8.2 | | | 22% | 1.8 | | 25% |

Based on the XRD result it can be assumed that 80% of the carbon is graphitic, thus the composition of the mixture can be stated as
(a) a graphite content of about 60 percent by weight,
(b) a metal content of about 25 percent by weight and
(c) a biochar content of about 15 percent by weight.

Example 3

Figure 8:
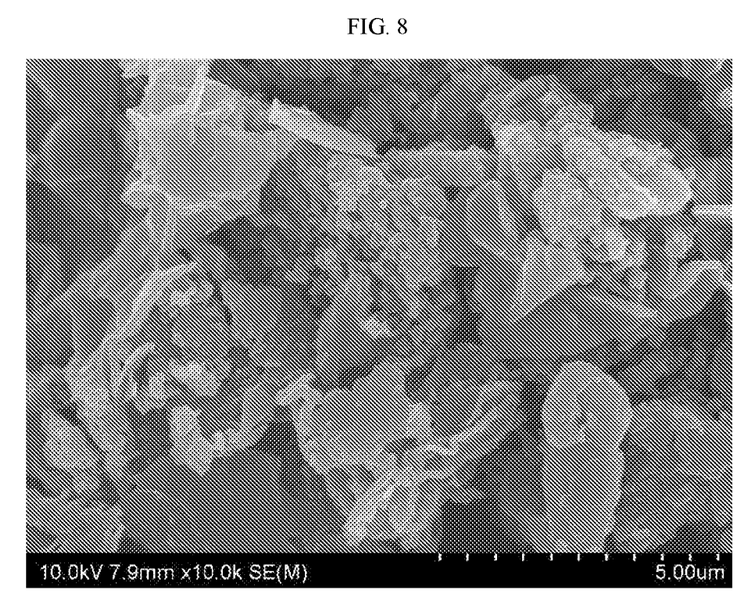
FIG. 8 shows a scanning electron image of the graphite sample generated during Example 3.
Figure 9:
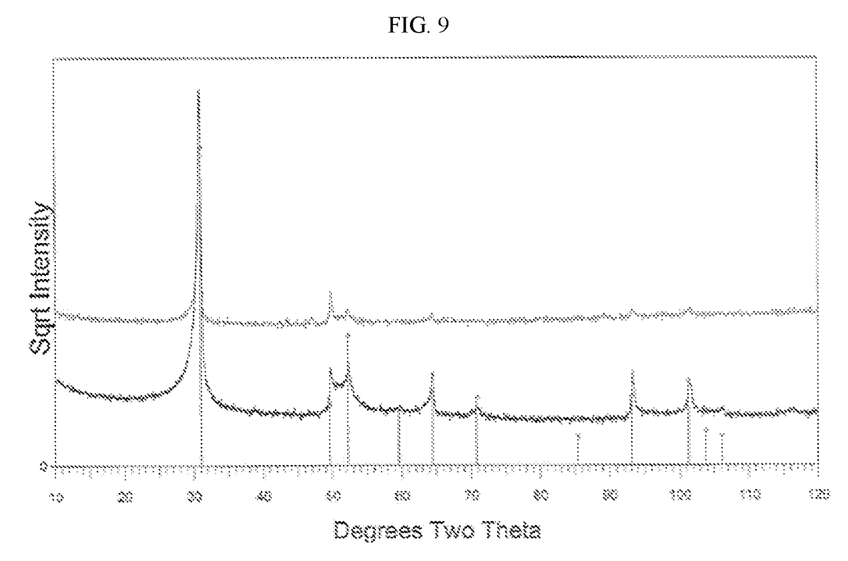
FIG. 9 shows an XRD diffractogram of the graphite sample generated during Example 3.

Sawdust (50 g) from pine trees (pinus radiata) was hydrothermally treated with pure water at a temperature of 360 degrees Celsius for 20 min in an autoclave. The sample was allowed to cool and then filtered using a Buchner funnel; the resulting char was dried in a conventional oven. The dry char (26.7 g) with carbon content around 80%, was combined with 16.2 g of Manganese Acetate (tetrahydrate). The resulting mixture was placed in a crucible and transferred to the microwave applicator. Inert conditions were established and power was gradually increased at a rate of approximately 30 W/min up to 1.3 kW. Temperature was measured to be between 1400-1600 degrees Celsius. The power was maintained steady for around 30 to 40 minutes after which the power was cut. Once cooled the sample was sieved to below 1 mm, at this point the mixture composition can be calculated as shown in Table 3. It was then leached with 500 ml of hydrochloric acid overnight, followed by washing with deionised water and filtering with a Buchner funnel. The resulting graphite was analysed using XRD (Bruker D8 Advance diffractometer using a mirror-derived 1 mm high parallel beam of cobalt K alpha radiation, weighted mean wavelength 1.709026 Angstroms) and SEM (using an ultra-high-resolution field-emission microscope: Zeiss Ultra Plus 55 FEGSEM, equipped with an in-lens detection system operating at an acceleration voltage of 1 to 10 kV. A working distance of between 1 and 5 mm was used and the powders were lightly deposited on carbon tape without any additional sample preparation). The XRD spectra is shown in FIG. 9 and indicates a d-spacing of 0.3360 nm, in addition since no other peaks except those for graphite it can be concluded that the sample has a graphite (carbon) purity in excess of 90% wt. A sample of the graphite was characterised and found to have a surface area of 50.2 m$^2$/g. Furthermore, since the XRD spectra lacks the broad, low intensity peak of amorphous carbon at low angles, it can be concluded that less than 20% of the carbon is not graphitic. The structure of the formed graphite is shown in FIG. 8, indicating an intermediary between flake-like particles and smaller, random crystallites with a more isotropic structure.

TABLE 3

Example 3 - Mixture Composition

| Component | Mass (g) | Carbon Yield (%) est. post reduction | Carbon (g) | Metal content of Mn Acetate (%) | Metal (g) | Carbon (%) | Metal (%) |
|---|---|---|---|---|---|---|---|
| Dry char | 26.7 | 55% | 14.685 | | | 80% | |
| Mn Acetate | 16.2 | | | 22% | 3.6 | | 20% |

Based on the XRD result it can be assumed that 80% of the carbon is graphitic, thus the composition of the mixture can be stated as:
(a) a graphite content of about 64 percent by weight,
(b) a metal content of about 20 percent by weight, and
(c) a biochar content of about 16 percent by weight.

Example 4

Figure 10:
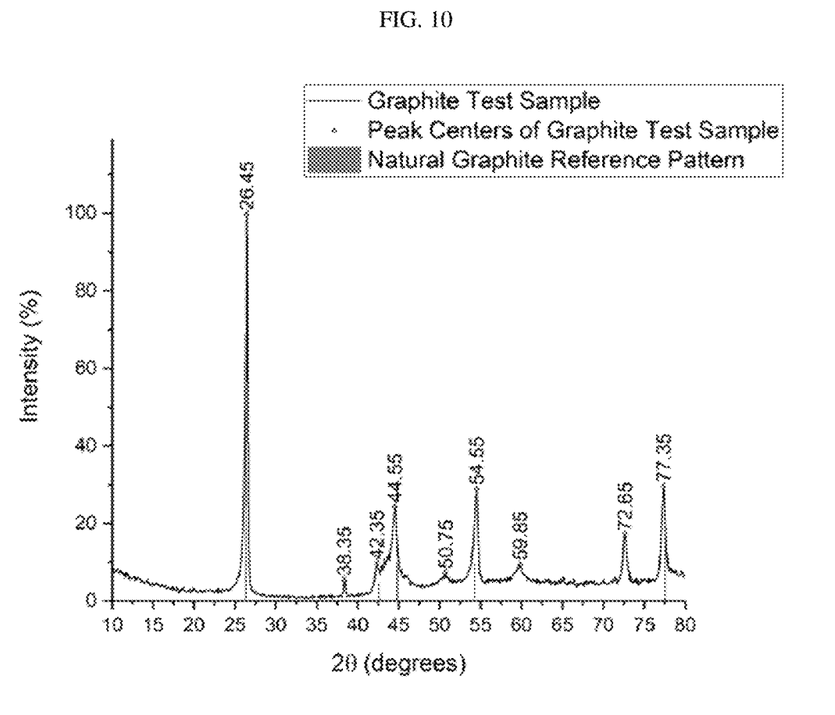
FIG. 10 shows an XRD diffractogram of the graphite sample referred to in Example 4.
Figure 11:
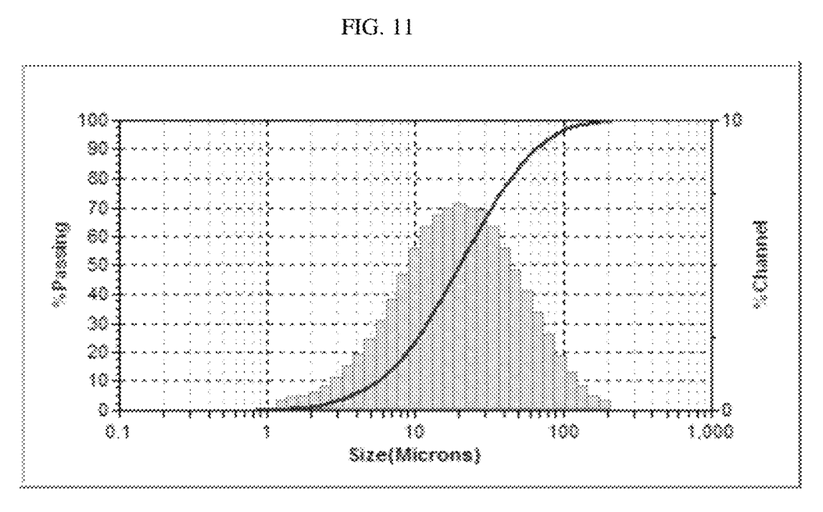
FIG. 11 shows a particle size distribution of the graphite sample referred to in Example 4.
Figure 12:
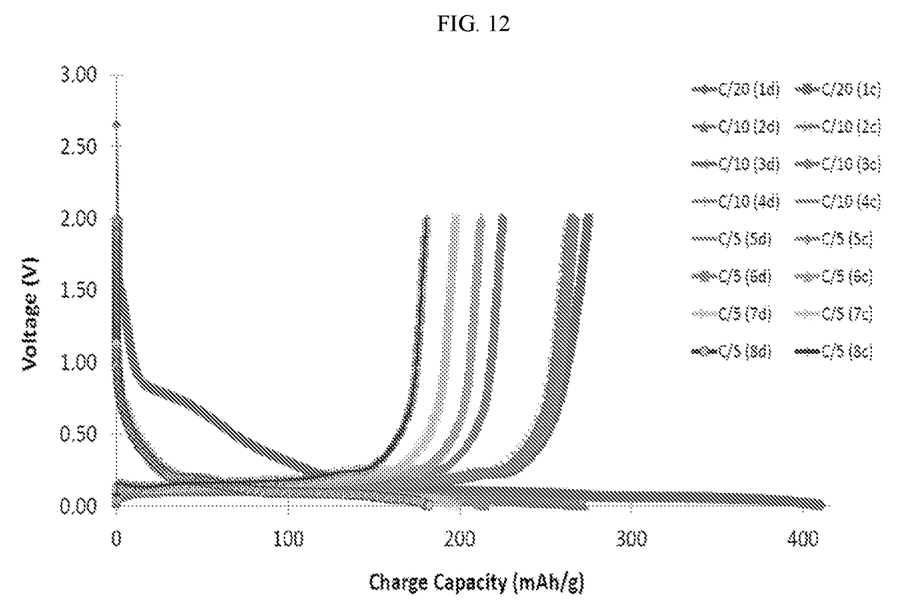
FIG. 12 shows the electrochemical behaviour of the graphite sample referred to in Example 4.

The graphite from several test runs under similar conditions as those described in Example 1 to 3, were mixed together to generate a large sample for battery testing. The mixed sample was analysed using XRD and found to have a d-spacing of around 0.3378 nm as shown in FIG. 10. Surface area was measured as 52.85 m$^2$/g. The particle size distribution was verified and the material was found to have an average particle size of 29.22 micron as demonstrated in FIG. 11. The lithium-ion battery performance was verified as follows: graphite was coated onto a copper foil using a suitable binder. After drying circular discs were cut using a punch and mallet. These were combined with lithium metal foil to form a coin cell. The organic electrolyte consisting of LiPF$_6$ and ethylene carbonate was introduced under inert conditions. The coin cell was sealed and tested using a potentiostat. The electrochemical data was collected and analysed manually after testing in CR2016 coin cells. FIG. 12 shows first charge and discharge cycles at C/20 (C being the theoretical capacity of graphite which is 372 mAh/g) at constant current rate. The specific capacity obtained from the first discharge cycle for the CarbonScape graphite in the half cell is 410.87 mAh/g while the charge capacity is 275 mAh/g. This gives a first cycle or "Coloumbic" efficiency of 66.46%, thus the graphite exhibits properties which are suitable for use in lithium-ion batteries.

Example 5

Figure 13:
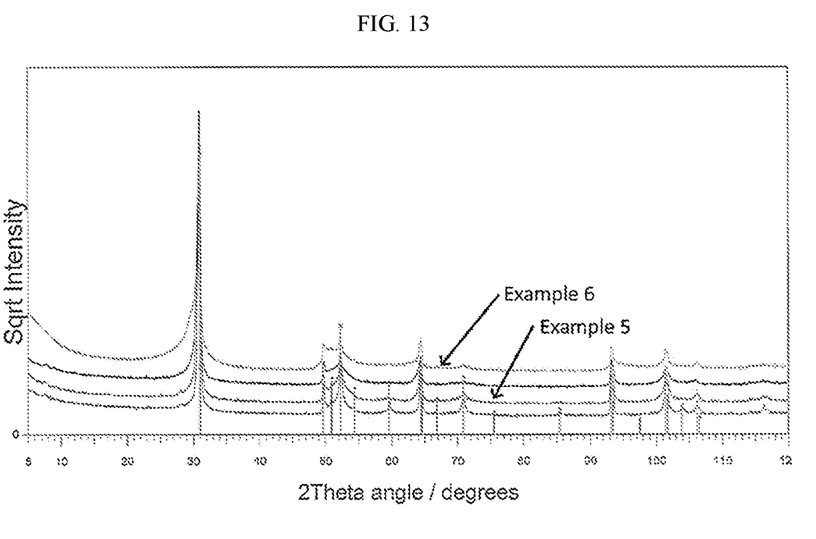
FIG. 13 shows the XRD diffractograms of the graphite samples generated during Example 5 and 6.

Sawdust (~10 g) from pine trees (pinus radiata) was combined with around 17.6 g of Manganese Acetate (tetrahydrate). The resulting mixture was placed in a crucible and heated in a conventional, electrically heated furnace (RD WEBB Aircooled Vacuum Furnace model RD-G). Inert conditions were established by purging with Argon gas (>99.9%) and the temperature was increased at a ramp rate of 10 degrees per minute. Final temperature was set at 1750 degrees Celsius. The temperature was maintained steady for 180 minutes after which the furnace was switched off. Once cooled the sample was sieved to below 1 mm, at this point the mixture composition can be calculated as shown in Table 4. It was then leached with 500 ml of hydrochloric acid overnight, followed by washing with deionised water and filtering with a Buchner funnel. The resulting graphite was analysed using XRD (Bruker D8 Advance diffractometer using a mirror-derived 1 mm high parallel beam of cobalt K alpha radiation, weighted mean wavelength 1.709026 Angstroms). The XRD spectra is shown in FIG. 13 and indicates a d-spacing of 0.3358 nm, in addition since no other peaks except those for graphite it can be concluded that the sample has a graphite (carbon) purity in excess of 90% wt. Using the established correlation between d-spacing and discharge capacity [5], this material may be estimated to have an electrochemical capacity of around 351 mAh/g. Furthermore, since the XRD spectra lacks the broad, low intensity peak of amorphous carbon at low angles, it can be concluded that less than 20% of the carbon is not graphitic. A sample of the graphite was characterised and found to have an unexpectedly low surface area of 5.439 m$^2$/g. Using the established correlation between "Coulombic efficiency" and specific surface area [5], this material may be estimated to have a "Coulombic efficiency" of around 85%.

TABLE 4

Example 5 - Mixture Composition

| Component | Mass (g) | Carbon Yield (%) est. post reduction | Carbon (g) | Metal content of Mn Acetate (%) | Metal (g) | Carbon (%) | Metal (%) |
|---|---|---|---|---|---|---|---|
| Sawdust | 10 | 20% | 2 | | | 34% | |
| Mn Acetate | 17.6 | | | 22% | 3.9 | | 66% |

Based on the XRD result it can be assumed that 80% of the carbon is graphitic, thus the composition of the mixture can be stated as:
(a) a graphite content of about 27 percent by weight,
(b) a metal content of about 66 percent by weight, and
(c) a biochar content of about 7 percent by weight.

Example 6

Pyrolyzed hard wood charcoal (~10 g) obtained from "Solid Energy" in New Zealand was milled and sieved to below 200 microns. The char, with a carbon content of around 70%, was combined with around 6.6 g of Manganese Oxide. The resulting mixture was placed in a crucible and heated in a conventional, electrically heated furnace (RD WEBB Aircooled Vacuum Furnace model RD-G). Inert conditions were established by purging with Argon gas (>99.9%) and the temperature was increased at a ramp rate of 10 degrees per minute. Final temperature was set at 1750 degrees Celsius. The temperature was maintained steady for 180 minutes after which the furnace was switched off. Once cooled the sample was sieved to below 1 mm, at this point the mixture composition can be calculated as shown in Table 5. It was then leached with 500 ml of hydrochloric acid overnight, followed by washing with deionised water and filtering with a Buchner funnel. The resulting graphite was analysed using XRD (Bruker D8 Advance diffractometer using a mirror-derived 1 mm high parallel beam of cobalt K alpha radiation, weighted mean wavelength 1.709026 Angstroms). The XRD spectra is for this sample is also shown in FIG. 13 and indicates a d-spacing of 0.3362 nm, in addition since no other peaks except those for graphite it can be concluded that the sample has a graphite (carbon) purity in excess of 90% wt. Using the established correlation between d-spacing and discharge capacity [5], this material may be estimated to have an electrochemical capacity of around 346 mAh/g. Furthermore, since the XRD spectra lacks the broad, low intensity peak of amorphous carbon at low angles, it can be concluded that less than 20% of the carbon is not graphitic. A sample of the graphite was characterised and found to have an exceptionally low surface area of just 0.204 $m^2/g$. Using the established correlation between "Coulombic efficiency" and specific surface area [5], this material may be estimated to have a "Coulombic efficiency" of around 96%.

TABLE 5

Example 6 - Mixture Composition

| Component | Mass (g) | Carbon Yield (%) est. post reduction | Carbon (g) | Metal content of Mn Oxide (%) | Metal (g) | Carbon (%) | Metal (%) |
|---|---|---|---|---|---|---|---|
| Dry Char | 10 | 80% | 8 | | | 66% | |
| Mn Oxide | 6.6 | | | 63% | 4.2 | | 34% |

Based on the XRD result it can be assumed that 80% of the carbon is graphitic, thus the composition of the mixture can be stated as:
(a) a graphite content of about 53 percent by weight,
(b) a metal content of about 34 percent by weight, and
(c) a biochar content of about 13 percent by weight.

Figure 14:
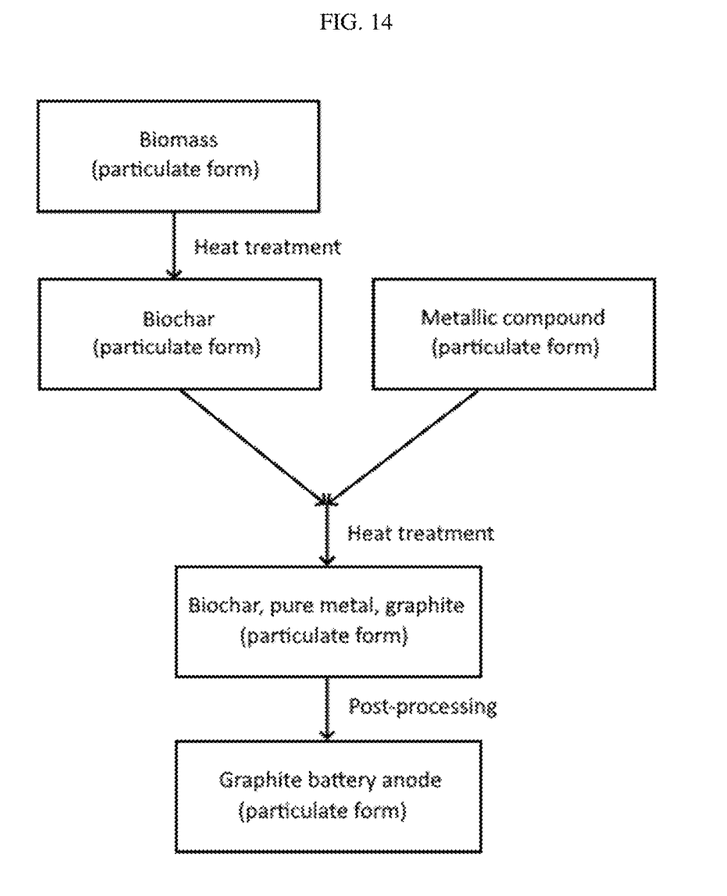
FIG. 14 is a process diagram showing the overall conversion of biomass to graphite anode powder for lithium-ion batteries.

The schematic outline of the overall process is shown in FIG. 14, where biomass in particulate form (1) is processed to graphite powder (4), suitable for use in battery anodes. The biomass (1) is converted to biochar (2) in particulate form. The biochar (2) is then combined with a metal in particulate form and heat treated to form the composition of matter (3). The composition of the mixture (3) of biochar, graphite and metal is then used to form the graphite powder (4). The graphite powder (4) is created by processing the mixture (3) as described above in the Examples.

As can be seen from the examples and FIG. 14, it is possible to achieve a graphite powder having properties suitable for use as a high performance lithium-ion battery anode powder. Due to the unique starting point of the process, compared to conventional natural and synthetic graphite, the resulting anode powder has been found to be unique in terms of its structure and performance. Because of this, the graphite powder achieved exhibits a distinctive set of performance characteristics and is capable of outperforming both natural and synthetic graphite in specific lithium-ion battery applications. In addition, the current graphite is the only material with a negative $CO_2$ emissions footprint. This makes it an environmentally friendly option.

What is claimed is:

1. A composition of matter comprising a mixture of biochar, a metal and graphite, with (a) a graphite content of between about 25 to 65 percent by weight, (b) a metal content of between about 15 to 75 percent by weight and (c) a biochar content of between 1 and 35 percent by weight; and wherein the mixture has a total graphitic carbon content greater than about 55% by weight.

2. The composition as claimed in claim 1, wherein the graphite has a d-spacing of between about 0.3354 and 0.3401 nm.

3. The composition as claimed in claim 1, wherein the graphite electrochemical capacity is at least 200 mAh/g.

4. The composition as claimed in claim 1, wherein the graphite has a specific surface area of between about 0.2 and 50 $m^2/g$.

5. The composition as claimed in claim 1, wherein the graphite exhibits a "Coulombic" or first cycle efficiency of greater than 60%.

6. The composition as claimed in claim 1, wherein the graphite exhibits a "Coulombic" or first cycle efficiency of greater than 80%.

7. The composition as claimed in claim 1 wherein one or more of the following apply:
    (i) the graphite content in the mixture is in particulate form;
    (ii) the metal content in the mixture is in particulate form;
    (iii) the biochar content in the mixture is in particulate form; and
    (iv) the graphite, metal and biochar content are all in particulate form.

8. The composition as claimed in claim 1, wherein the mixture is a binary mixture having an elemental composition of between about 25 to 75 percent carbon made up of biochar and graphite and between about 75 to 25 percent of a selected metal.

9. The composition as claimed in claim 1, wherein the biochar content is derived from woody biomass heated to temperatures of between about 200 and 1000 degrees Celsius.

10. The composition as claimed in claim 1, wherein the metal is a transition metal.

11. The composition as claimed in claim 10, wherein the transition metal is selected from chromium, zirconium, molybdenum, ruthenium, rhodium, palladium, silver, cadmium, zinc, copper, nickel, cobalt, iron, manganese, chromium, vanadium and any combination thereof.

12. The composition as claimed in claim 1, wherein one or more of the following apply:
   (i) the biochar component has a particulate size of less than about 1 mm;
   (ii) the metal component has a particulate size of less than about 1;
   (iii) the graphite component has a particulate size of less than about 1 mm; and
   (iv) the particulate sizes of all the components are less than 1 mm.

* * * * *